United States Patent
Shin

(10) Patent No.: US 11,250,755 B2
(45) Date of Patent: Feb. 15, 2022

(54) DISPLAY DEVICE AND DRIVING METHOD THEREOF

(71) Applicant: SAMSUNG DISPLAY CO., LTD., Yongin-si (KR)

(72) Inventor: Kwang Suk Shin, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 17/004,160

(22) Filed: Aug. 27, 2020

(65) Prior Publication Data

US 2020/0394945 A1 Dec. 17, 2020

Related U.S. Application Data

(63) Continuation of application No. 16/177,770, filed on Nov. 1, 2018, now Pat. No. 1,076,819.

(30) Foreign Application Priority Data

Dec. 18, 2017 (KR) .................. 10-2017-0174479

(51) Int. Cl.
 *G09G 3/20* (2006.01)
 *G06K 9/00* (2022.01)
(52) U.S. Cl.
 CPC ............. *G09G 3/20* (2013.01); *G06K 9/0004* (2013.01); *G09G 2320/064* (2013.01); *G09G 2320/0673* (2013.01); *G09G 2354/00* (2013.01)
(58) Field of Classification Search
 CPC ......... G06K 9/0004; G09G 2320/0271; G09G 2320/064; G09G 2320/0673; G09G 2320/0686; G09G 2354/00; G09G 3/20; G09G 3/3233

USPC .................................................. 345/170–178
See application file for complete search history.

(56) References Cited

U.S. PATENT DOCUMENTS

| 9,467,848 | B1 | 10/2016 | Song |
| 10,366,272 | B2 | 7/2019 | Song et al. |
| 10,410,036 | B2 | 9/2019 | He et al. |
| 10,628,569 | B2 | 4/2020 | Li |
| 2002/0006233 | A1* | 1/2002 | Adachi ............... G06K 9/6203 382/289 |
| 2004/0252867 | A1* | 12/2004 | Lan .................. G06K 9/0004 382/124 |

(Continued)

FOREIGN PATENT DOCUMENTS

| CN | 106663156 A | 5/2017 |
| CN | 107004130 A | 8/2017 |

(Continued)

OTHER PUBLICATIONS

Chinese Office Action for Application No. 2018115226346 dated Sep. 16, 2021.

*Primary Examiner* — Chun-Nan Lin
(74) *Attorney, Agent, or Firm* — Cantor Colburn LLP

(57) ABSTRACT

A display device includes: a display panel which displays an image corresponding to an input image data in a display area; and a fingerprint sensor which senses a fingerprint of a finger using light reflected by the finger positioned on the display area among light emitted from the display panel. When a fingerprint sensing mode is changed to an activated state from an inactivated state, a luminance of an image displayed in a first display area corresponding to a position of the finger in the display area is increased.

15 Claims, 7 Drawing Sheets

(56) References Cited

U.S. PATENT DOCUMENTS

| | | |
|---|---|---|
| 2005/0226469 A1 | 10/2005 | Ho |
| 2010/0208953 A1 | 8/2010 | Gardner et al. |
| 2013/0063407 A1 | 3/2013 | Usukura et al. |
| 2013/0076485 A1 | 3/2013 | Mullins |
| 2013/0194322 A1* | 8/2013 | Kang ................... G09G 3/06 345/691 |
| 2014/0133711 A1* | 5/2014 | Abe ................ G06K 9/00067 382/115 |
| 2015/0004939 A1 | 1/2015 | Higashibeppu |
| 2015/0199553 A1 | 7/2015 | Kim et al. |
| 2015/0242696 A1 | 8/2015 | Kim et al. |
| 2015/0325207 A1 | 11/2015 | Hara |
| 2016/0232397 A1 | 8/2016 | Yu et al. |
| 2016/0266695 A1* | 9/2016 | Bae .................. G06F 3/04166 |
| 2016/0299556 A1 | 10/2016 | Jueng et al. |
| 2017/0220838 A1* | 8/2017 | He ........................ G06F 3/044 |
| 2017/0220842 A1* | 8/2017 | Thompson ......... G06K 9/00013 |
| 2017/0270342 A1 | 9/2017 | He et al. |
| 2017/0300736 A1* | 10/2017 | Song ................... G06K 9/0004 |
| 2017/0364763 A1* | 12/2017 | Jin .......................... G06F 21/32 |
| 2018/0074627 A1* | 3/2018 | Kong .................. G06K 9/00013 |
| 2018/0089491 A1 | 3/2018 | Kim et al. |
| 2018/0114047 A1* | 4/2018 | Kim ................... G06K 9/00026 |
| 2018/0129798 A1 | 5/2018 | He et al. |
| 2018/0196931 A1* | 7/2018 | Cho ...................... G06F 3/0412 |
| 2018/0260602 A1* | 9/2018 | He ....................... A61B 5/1495 |
| 2018/0314206 A1* | 11/2018 | Lee ...................... G02B 27/095 |
| 2019/0034020 A1 | 1/2019 | He et al. |
| 2019/0102597 A1 | 4/2019 | Lu et al. |
| 2019/0205593 A1* | 7/2019 | Kim ................... H01L 51/5237 |
| 2019/0228139 A1 | 7/2019 | Oh et al. |
| 2019/0228204 A1 | 7/2019 | Park et al. |
| 2019/0278967 A1* | 9/2019 | Shepelev ................. G09G 3/32 |

FOREIGN PATENT DOCUMENTS

| | | |
|---|---|---|
| CN | 107295195 A | 10/2017 |
| CN | 107305411 A | 10/2017 |
| KR | 101407936 B1 | 6/2014 |
| KR | 1020180034750 A | 4/2018 |

\* cited by examiner

[FIG. 1]
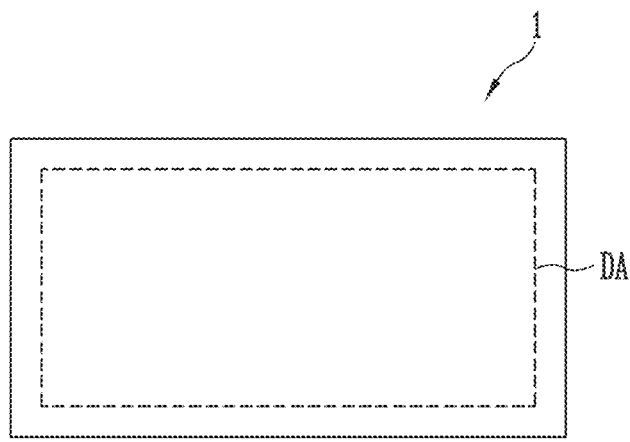
[FIG. 2]
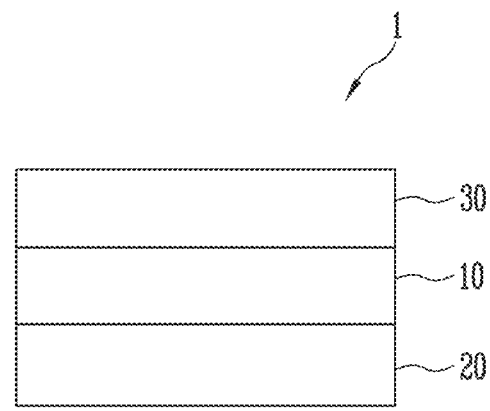

[FIG. 3]
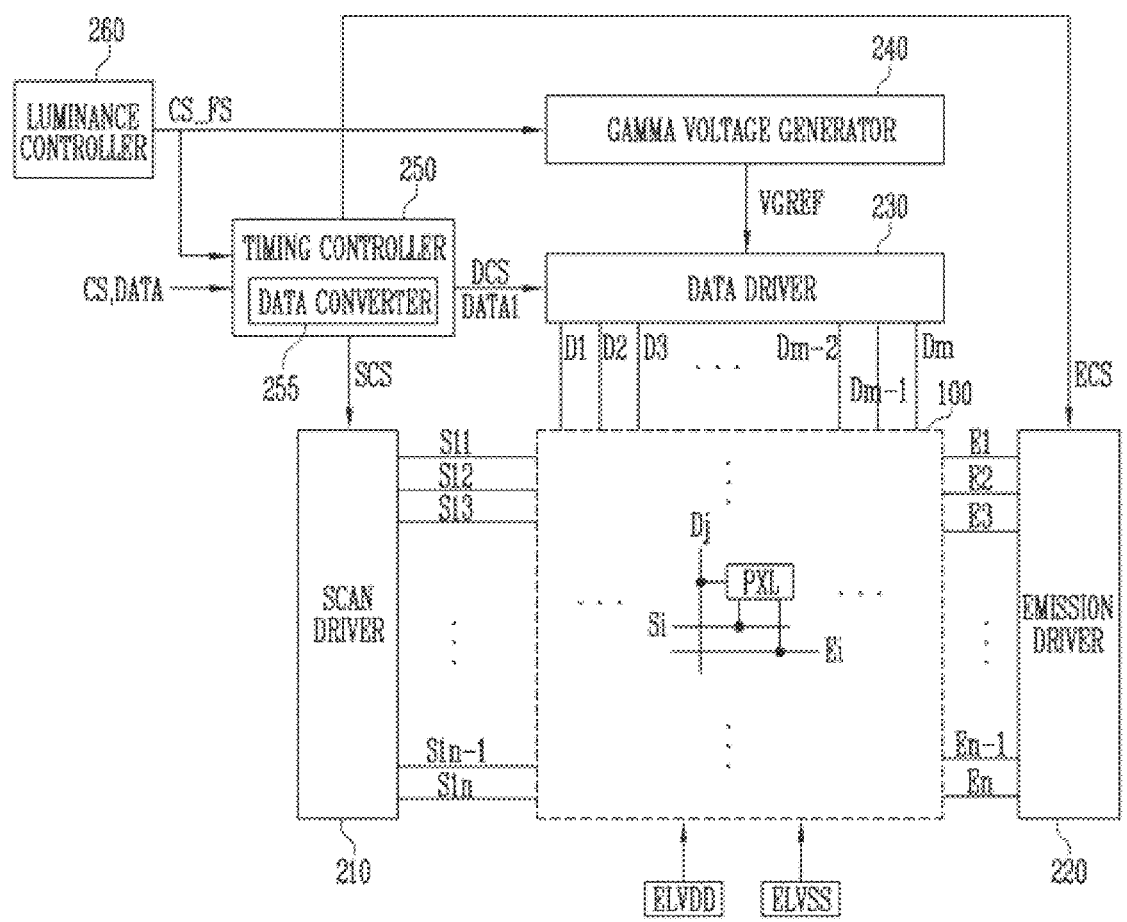
[FIG. 4]
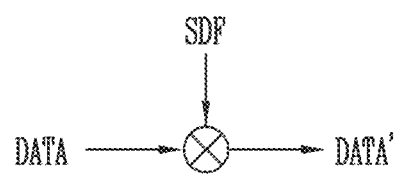

[FIG. 5]
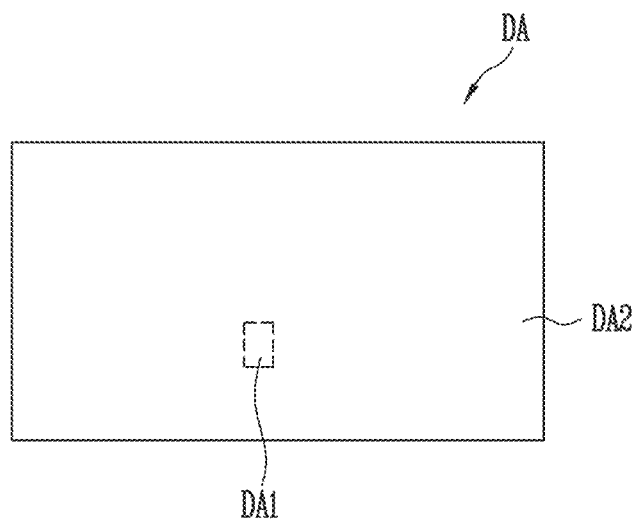
[FIG. 6A]
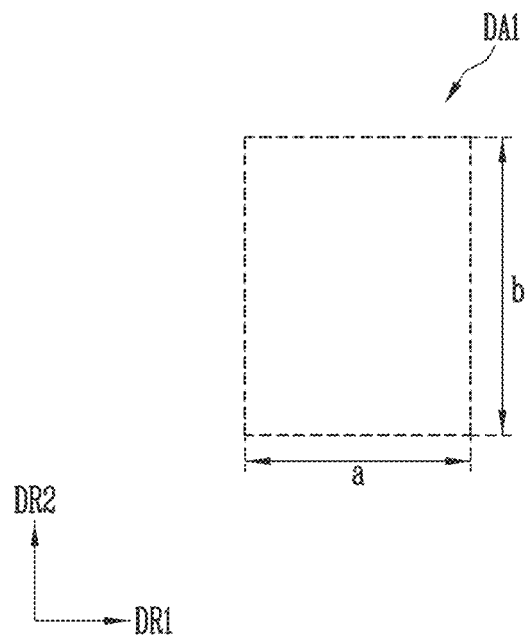

[FIG. 6B]
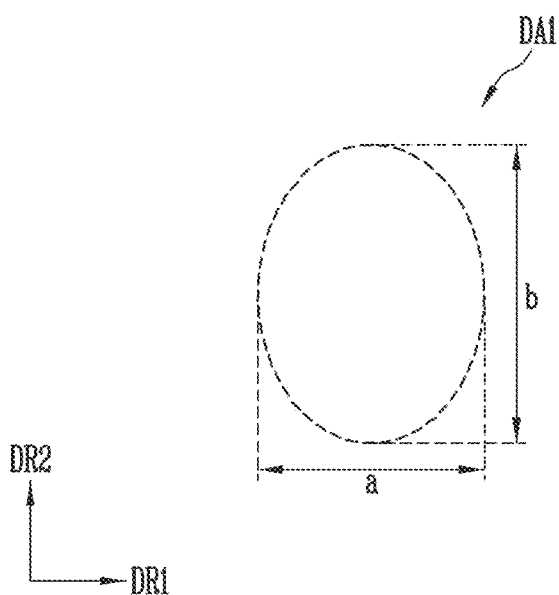
[FIG. 7]
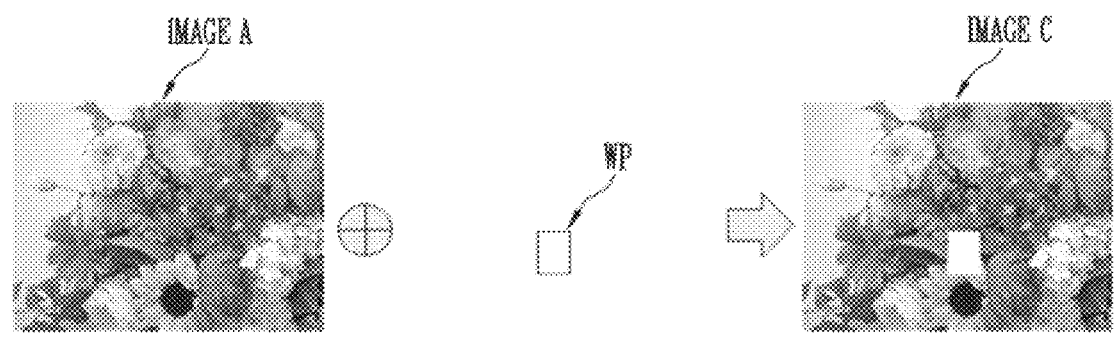

[FIG. 8]
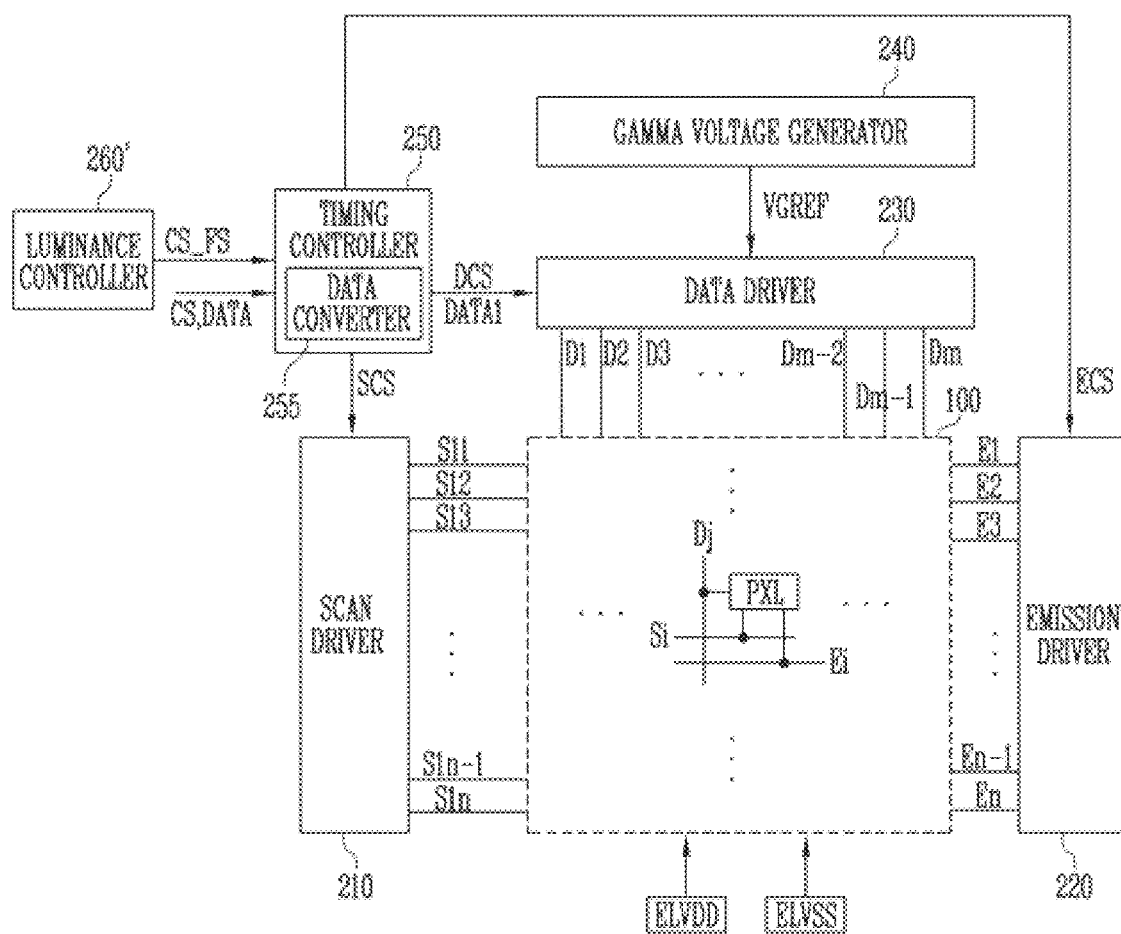

[FIG. 9]
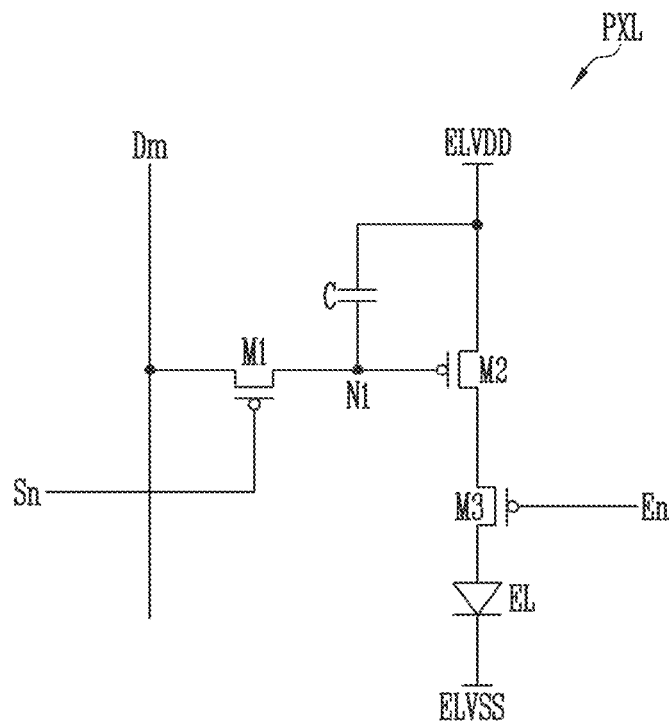
[FIG. 10]
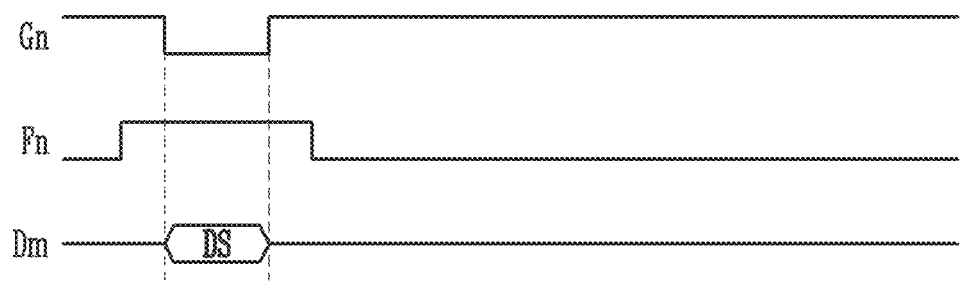

[FIG. 11]
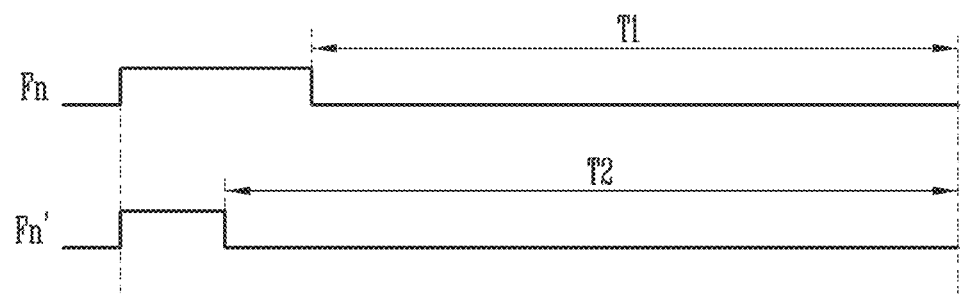

DISPLAY DEVICE AND DRIVING METHOD THEREOF

This application is a continuation of U.S. patent application Ser. No. 16/177,770, filed on Nov. 1, 2018, which claims priority to Korean Patent Application No. 10-2017-0174479, filed on Dec. 18, 2017, and all the benefits accruing therefrom under 35 U.S.C. § 119, the content of which in its entirety is herein incorporated by reference.

BACKGROUND

1. Field

The disclosure relates to a display device and a driving method thereof.

2. Description of the Related Art

Recently, there is an increasing demand for a display device that provides various functions such as a fingerprint sensing function. In such a display device, a method of attaching a separate fingerprint sensor to a predetermined area of a display panel may be used to provide a fingerprint sensing function. Such a fingerprint sensor typically includes, for example, a separate light source, a lens, and an image sensor.

SUMMARY

When a fingerprint sensor including a separate light source, a lens, and an image sensor is attached to a display panel for a fingerprint sensing function, the display device may have an increased thickness and the manufacturing cost thereof may increase.

Embodiments provide a display device including a fingerprint sensor without using a separate external light source and preventing deterioration of image quality.

According to an embodiment of the invention, a display device includes: a display panel which displays an image corresponding to input image data in a display area; and a fingerprint sensor which senses a fingerprint of a finger using light reflected by the finger positioned on the display area among light emitted from the display panel. In such an embodiment, when a fingerprint sensing mode is changed to an activated state from an inactivated state, a luminance of an image displayed in a first display area of the display area corresponding to a position of the finger is increased.

In an embodiment, the display panel may include a luminance controller which sets a target luminance of the image to a first luminance when the fingerprint sensing mode is in the inactivated state and sets the target luminance of the image to a second luminance, which is higher than the first luminance, when the fingerprint sensing mode is in the activated state.

In an embodiment, the luminance controller may select a first gamma driving voltage when the fingerprint sensing mode is in the inactivated state, and select a second gamma driving voltage different from the first gamma driving voltage when the fingerprint sensing mode is in the activated state.

In an embodiment, the display panel may further include a plurality of pixels, where each of the plurality of pixels may include a light emitting device, and the luminance controller may control the light emitting device to emit light during a first period in a frame when the fingerprint sensing mode is in the inactivated state, and control the light emitting device to emit light during a second period, which his longer than the first period, in the frame when the fingerprint sensing mode is in the activated state.

In an embodiment, the display panel may further include a data converter which generates scaled-down input image data by applying a predetermined correction coefficient to the input image data when the fingerprint sensing mode is in the activated state.

In an embodiment, a luminance of an image corresponding to the scaled-down input image data may be closer to the first luminance than the second luminance.

In an embodiment, the data converter may convert the scaled-down input image data based on data corresponding to a white pattern.

In an embodiment, the data converter may correct the scaled-down input image data to increase a gray scale of data corresponding to the first display area of the scaled-down input image data.

In an embodiment, when the fingerprint sensing mode is changed from the inactivated state to the activated state, a white image may be displayed in the first display area.

In an embodiment, the display area may include a second display area which is a remaining area excluding the first display area from the display area, and a luminance of an image displayed in the second display area when the fingerprint sensing mode is in the inactivated state may be substantially the same as a luminance of an image displayed in the second display area when the fingerprint sensing mode is in the activated state.

According to another embodiment of the invention, a method for driving a display device including a display panel for displaying an image corresponding to input image data in a display area and a fingerprint sensor for sensing a fingerprint of a finger using light reflected by the finger positioned on the display area among light emitted from the display panel, includes: activating a fingerprint sensing mode; and increasing a luminance of an image displayed in a first display area corresponding to a position of the finger in the display area.

In an embodiment, the increasing the luminance of the image displayed in the first display area may include: increasing a target luminance of the image; and generating scaled-down input image data by applying a predetermined correction coefficient to the input image data.

In an embodiment, the increasing the target luminance of the image may including changing a gamma driving voltage.

In an embodiment, the display panel may include a plurality of pixels, where each of the plurality of pixels may include a light emitting device, and the increasing the target luminance of the image may include increasing an emission period of the light emitting device.

In an embodiment, the increasing the luminance of the image displayed in the first display area may further include correcting the scaled-down input image data to increase a gray scale of data corresponding to the first display area of the scaled-down input image data.

In an embodiment, the increasing the luminance of the image displayed in the first display area may be performed in a vertical blank period between frames.

BRIEF DESCRIPTION OF THE DRAWINGS

The above and other features of the invention will become more apparent by describing in further detail exemplary embodiments thereof with reference to the accompanying drawings, in which:

FIG. 1 is a diagram illustrating a display area of a display device according to an embodiment of the disclosure;

FIG. 2 is a diagram schematically illustrating a configuration of a display device according to an embodiment of the disclosure;

FIG. 3 is a diagram illustrating a configuration of an embodiment of a display panel shown in FIG. 2;

FIG. 4 is a diagram illustrating a function of a data converter according to an embodiment of the disclosure;

FIG. 5 is a diagram illustrating a display area including a first display area and a second display area;

FIGS. 6A and 6B are diagrams exemplarily illustrating the first display area according to an embodiment of the disclosure;

FIG. 7 is a diagram illustrating another function of the data converter according to an embodiment of the disclosure;

FIG. 8 is a diagram illustrating a configuration of an alternative embodiment of the display panel shown in FIG. 2;

FIG. 9 is a diagram illustrating a configuration of an embodiment of a pixel shown in FIG. 8;

FIG. 10 is a diagram illustrating an embodiment of a driving method of the pixel shown in FIG. 9; and FIG. 11 is a diagram exemplarily illustrating emission control signals corresponding to a control of a luminance controller shown in FIG. 8.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in greater detail with reference to the accompanying drawings.

FIG. 1 is a diagram illustrating a display area of a display device 1 according to an embodiment of the disclosure, and FIG. 2 is a diagram schematically illustrating a configuration of the display device 1 according to an embodiment of the disclosure.

Referring to FIG. 1, an embodiment of the display device 1 according to the disclosure may include a display area DA on which an image is displayed. The display device 1, which serving to out an image to a user, may display the image on the display area DA. Accordingly, the user of the display device 10 may view the images displayed in the display area DA.

In such an embodiment, the display device 1 may recognize or sense a touch and a fingerprint of a specific user inputted through the display area DA for convenience of manipulation and security.

Referring to FIG. 2, an embodiment of the display device 1 according to the disclosure may include a display panel 10, a fingerprint sensor 20, and a touch sensor 30.

The display panel 10 may display images on the display area DA. The display panel 10 may be an organic light emitting display panel, a liquid crystal display panel, or a plasma display panel, but not being limited thereto.

In an embodiment, the fingerprint sensor 20 may receive a fingerprint of a user through the display area DA and sense the fingerprint. In such an embodiment, the fingerprint sensor 20 may sense the fingerprint of the user by using light emitted from pixels of the display panel 10. The fingerprint sensor 20 may include a plurality of sensors for converting the light received from the pixels into electrical signals and outputting the electrical signals.

The touch sensor 30 may receive a touch of a user through the display area DA and sense the touch. The touch sensor 30 may include a capacitive type touch sensor, for example, but not being limited thereto. The touch sensor 30 may include at least one of various types of touch sensors.

In an embodiment of the display device 1 according to disclosure, the fingerprint sensor 20 for sensing a fingerprint may use a light emitting device in the pixels for displaying images as a light source without using a separate external light source.

Accordingly, in such an embodiment, a display device with a fingerprint sensor may have a reduced thickness and the manufacturing cost thereof may be reduced. A sufficient amount of light may be desired to detect a fingerprint more accurately. Therefore, the luminance of an image may be increased so that a light emitting device may emit light with high intensely.

However, when the luminance of the entire image displayed in the display area DA is increased, the luminance of the remaining area except for the area to which the fingerprint is input may be increased. Therefore, power consumption of the display device may be increased and eye fatigue may be caused.

Accordingly, a method for securing only the amount of the light for detecting a fingerprint may be desired. An embodiment of a driving method of a display device capable of securing appropriate amount of the light for detecting a fingerprint will be described below in greater detail.

FIG. 3 is a diagram illustrating a configuration of an embodiment of the display panel 10 shown in FIG. 2.

Referring to FIG. 3, an embodiment of the display panel 10 according to the disclosure may include a display unit 100, a scan driver 210, an emission driver 220, a data driver 230, a gamma voltage generator 240, a timing controller 250 and a luminance controller 260.

According to an embodiment of the disclosure, a fingerprint sensing mode of the display device 1 may be activated in a specific situation. In one embodiment, for example, when user authentication is performed to use the display device 1 in an inactive state (e.g., a locked state) or when user authentication is performed to use a specific function such as login, the fingerprint sensing mode may be activated. When the authentication of the fingerprint inputted to the fingerprint sensor unit 20 ends after the fingerprint sensing mode is activated, the fingerprint sensing mode may be inactivated.

In such an embodiment, the luminance controller 260 may control a luminance of images to be displayed in the display area DA in consideration of whether the fingerprint sensing mode is active or inactive.

In an embodiment, the luminance controller 260 may set a target luminance of the images to be displayed in the display area DA to a first luminance when the fingerprint sensing mode is inactive. In such an embodiment, the luminance controller 260 may set the target luminance of the images to be displayed in the display area DA to a second luminance higher than the first luminance when the fingerprint sensing mode is active.

In such an embodiment, the luminance controller 260 may select a first gamma voltage when the fingerprint sensing mode is inactive, and select a second gamma voltage, which is different from the first gamma voltage, when the fingerprint sensing mode is active.

The gamma voltage generator 240 may generate a plurality of gamma voltages VGREF, based on a gamma driving voltage.

The gamma voltage generator 240 may receive a control signal CS_FS corresponding to the fingerprint sensing mode from the luminance controller 260. The control signal CS_FS may include data related to the first gamma driving voltage or the second gamma driving voltage. The first gamma driving voltage and the second gamma driving voltage may be gamma voltages corresponding to a high level gray scale.

In an embodiment, when the luminance controller 260 selects the first gamma driving voltage, the gamma voltage generator 240 may generate the plurality of gamma voltages VGREF based on a reference gamma driving voltage and the first gamma driving voltage. Each of the plurality of gamma voltages VGREF may have a value between the reference gamma driving voltage and the first gamma driving voltage.

In such an embodiment, when the luminance controller 260 selects the second gamma driving voltage, the gamma voltage generator 240 may generate the plurality of gamma voltages VGREF based on the reference gamma driving voltage and the second gamma driving voltage. Each of the plurality of gamma voltages VGREF may have a value between the reference gamma driving voltage and the second gamma driving voltage.

The difference between the reference gamma driving voltage and the second gamma drive voltage may be greater than the difference between the reference gamma drive voltage and the first gamma drive voltage.

The luminance controller 260 may adjust the gamma voltages VGREF to increase the luminance of the images, thereby increasing the amount of light emitted by the light emitting device in the display unit 100.

The timing controller 250 may generate a scan driving control signal SCS, a data driving control signal DCS, and an emission driving control signal ECS, based on signals CS input from an outside.

The scan driving control signal SCS generated by the timing controller 250 may be supplied to the scan driver 210, the data driving control signal DCS generated by the timing controller 250 may be supplied to the data driver 230, and the emission driving control signal ECS generated by the timing controller 250 may be supplied to the emission driver 220.

The timing controller 250 may include a data converter 255. The data converter 255 may convert input image data DATA based on the luminance control of the luminance controller 260, e.g., based on the control signal CS_FS corresponding to the fingerprint sensing mode from the luminance controller 260.

The data converter 255 may reduce the scale of the input image data DATA by applying a predetermined correction coefficient to the input image data DATA when the fingerprint sensing mode is active.

The scan driver 210 may supply a scan signal to scan lines S11 to S1$n$ in response to the scan driving control signal SCS. In one embodiment, for example, the scan driver 210 may sequentially supply the scan signal to the scan lines S11 to S1$n$.

The data driver 230 may supply a data signal to data lines D1 to Dm in response to converted input image data DATA1 and the data driving control signal DCS from the timing controller 250. The data signal supplied to the data lines D1 to Dm may be supplied to pixels PXL selected by the scan signal.

The emission driver 220 may supply an emission control signal to emission control lines E1 to En in response to the emission driving control signal ECS. In one embodiment, for example, the emission driver 220 may sequentially supply the emission control signal to the emission control lines E1 to En.

As illustrated in FIG. 3, the scan driver 210 and the emission driver 220 may be components separate from each other, but the disclosure is not limited thereto. In one embodiment, for example, the scan driver 210 and the emission driver 220 may be formed as one driver.

In addition, the scan driver 210 and/or the emission driver 220 may be mounted on a substrate through a thin film process. Also, the scan driver 210 and/or the emission driver 220 may be located at both sides of the display unit 100 with the display unit 100 interposed therebetween.

The display unit 100 may include the plurality of pixels PXL coupled to the data lines D1 to Dm, the scan lines S11 to S1$n$, and the emission control lines E1 to En. The display unit 100 may correspond to the display area DA of the display panel 10.

The pixels PXL may be supplied with an initialization power source, a first power source ELVDD, and a second power source ELVSS.

Each of the pixels PXL may be selected (e.g., activated or turned on) when a scan signal is supplied to the scan lines S11 to S1n coupled thereto, and each selected pixel PXL may be supplied with a data signal. The pixel PXL supplied with the data signal may control the amount of current flowing from the first power source ELVDD to the second power source ELVSS via an light emitting device (not shown), corresponding to the data signal.

The light emitting device may generate light with a predetermined luminance, corresponding to the amount of current. In an embodiment, the first power source ELVDD may be set to a voltage higher than that of the second power source ELVSS.

In an embodiment, as illustrated in FIG. 3, a pixel PXL may be coupled to one scan line S11, one data line Dj, and one emission control line Ei, but the disclosure is not limited thereto. In one embodiment, for example, the plurality of scan lines S11 to S1n or the plurality of emission control lines E1 to En may be coupled to the pixel PXL, corresponding to the circuit structure of the pixel PXL.

FIG. 4 is a diagram illustrating a function of the data converter 255 according to an embodiment of the disclosure.

When the fingerprint sensing mode is active, the data converter 255 may generate scaled-down input image data DATA' by applying a predetermined correction factor SDF to the input image data DATA.

As described above, when the luminance of the entire image displayed in the display area DA is increased, the luminance of the remaining area except for the area to which the fingerprint is input may be increased. Therefore, power consumption of the display device may be increased and the user's eyes may be tired.

In an embodiment, when the fingerprint sensing mode is changed from the inactive state to the active state, the amount of light in an area for sensing a fingerprint may be increased, and the luminance of the area viewed by the user may be controlled to be maintained or not to be changed.

In an embodiment of the display device 1 according to the disclosure, when the fingerprint sensing mode is activated, the luminance controller 260 may select the gamma driving voltage for increasing the target luminance of an image to be displayed in the display area DA. Since the luminance of the entire image may be increased by increasing the target luminance, the scale of the input image data DATA may be decreased to allow images to have a same or similar luminance as before the gamma voltage change.

FIG. 5 is a diagram illustrating a display area including a first display area and a second display area.

In an embodiment, as shown in FIG. 5, when the fingerprint sensing mode is activated, the display area DA may be divided into a first display area DA1 and a second display area DA2.

The first display area DA1 may be an area corresponding to a position of a finger of a user on the display area DA.

The second display area DA2 may be a remaining area of the display area DA except for the first display area DA1.

FIGS. 6A and 6B are diagrams exemplarily illustrating the first display area DA1 according to an embodiment of the disclosure.

In an embodiment, as shown in FIG. 6A, the first display area DA1 may have a square shape. Alternatively, as shown in FIG. 6B, the first display area DA1 may have an elliptical shape. However, the disclosure is not limited thereto, and the shape of the first display area DA1 may be variously changed or modified.

In an embodiment, the size of the first display area DA1 may be preset. In one embodiment, for example, as shown in FIGS. 6A and 6B, the length of a horizontal direction DR1 of the first display area DA1 may be set to 'a', and the length of a vertical direction DR2 may be set to 'b'.

When a finger of a user touches the display area DA, the touch sensor 30 may calculate the center coordinates of the input touch. The center of the first display area DA1 may be the center coordinates calculated by the touch sensor 30.

FIG. 7 is a diagram illustrating another function of the data converter according to an embodiment of the disclosure. An image A in FIG. 7 may be an image corresponding to the input image data DATA' which is scaled-down when the second gamma driving voltage is selected. An image C in FIG. 7 may represent an image in which a white pattern WP is synthesized in the image A.

The data converter 255 may further convert the scaled-down input image data DATA'. In one embodiment, for example, the data converter 255 may synthesize the data corresponding to the white pattern WP to the scaled-down input image data DATA'.

In an embodiment, the white pattern WP may be applied to the first display area DA1. In such an embodiment, the size and shape of the white pattern WP may be the same as those of the first display area DA1.

When the data corresponding to the white pattern WP is applied to the input image data DATA' scaled-down by the data converter 255, a white image may be displayed only in the first display area DA1 as shown in FIG. 7. In such an embodiment, when the fingerprint sensing mode is activated, only the first display area DA1 may be displayed in white as the image C in FIG. 7.

In an embodiment, as illustrated in FIG. 7, the white image may be displayed in the first display area DA1 by applying the data corresponding to the white pattern WP at 100% to the scaled-down input image data DATA', but the disclosure is not limited thereto. In one embodiment, for example, the synthesis ratio of the data corresponding to the white pattern WP to the scaled-down data input image data DATA' may be variously changed or modified.

In an embodiment of the display device 1 according to the disclosure, when the fingerprint sensing mode is activated, a sufficient amount of the light for accurately detecting the fingerprint may be ensured by changing the gamma driving voltage and increasing a gray scale of the input data corresponding to the first display area DA1. In such an embodiment, since the first display area DA1 is hidden by a finger of a user, the first display area DA1 may not be visible to the user.

The change of the gamma driving voltage or the conversion of the input image data depending on activation or inactivation of the fingerprint sensing mode may be performed in a vertical blank period between each frame.

FIG. 8 is a diagram illustrating a configuration of an alternative embodiment of the display panel shown in FIG. 2. The diagram in FIG. 8 is substantially the same as the diagram shown in FIG. 3 except for a luminance controller 260'. The same or like elements shown in FIG. 8 have been labeled with the same reference characters as used above to describe the embodiments of the display panel shown in FIG. 3, and any repetitive detailed description thereof will hereinafter be omitted or simplified. Accordingly, hereinafter, functions of the luminance controller 260' will be mainly described.

The luminance controller 260' may control a luminance of images to be displayed in the display area DA in consideration of whether the fingerprint sensing mode is active or inactive.

In an embodiment, the luminance controller 260' may set a target luminance of the images to be displayed in the display area DA to a first luminance when the fingerprint sensing mode is inactive. In such an embodiment, the luminance controller 260 may set the target luminance of the images to be displayed in the display area DA to a second luminance higher than the first luminance when the fingerprint sensing mode is active.

In such an embodiment, the luminance controller 260' shown in FIG. 8 may control the target luminance using the emission control signal.

In an embodiment, the luminance controller 260' may control the light emitting device to emit light during a first period within one frame when the fingerprint sensing mode is deactivated, and may control the light emitting device to emit light during a second period longer than the first period within one frame when the fingerprint sensing mode is activated.

The timing controller 250 may generate the emission driving control signal ECS in response to the control signal CS_FS corresponding to the fingerprint sensing mode received from the luminance controller 260'. The emission driver 220 may generate an emission control signal (or a light emitting control signal) corresponding to the supplied emission driving control signal ECS. The emission control signal generated when the fingerprint sensing mode is activated may be different from the emission control signal generated when the fingerprint sensing mode is deactivated.

FIG. 9 is a diagram illustrating a configuration of an embodiment of a pixel PXL shown in FIG. 8. For convenience of description, a pixel PXL coupled to an n-th (n is a natural number) scan line Sn and an m-th data line Dm (m is a natural number) as illustrated in FIG. 9 will be described in detail.

Referring to FIG. 9, an embodiment of the pixel PXL may include a first transistor M1, a second transistor M2, a third transistor M3, a capacitor C, and a light emitting device EL.

The first transistor M1 may be connected between the m-th data line Dm and a first node N1, and a gate electrode of the first transistor M1 may be connected to the n-th scan line Sn. The first transistor M1 may be turned on when a scan signal having a gate-on voltage (e.g., a low voltage) is supplied from the n-th scan line Sn. When the first transistor M1 is turned on, the m-th data line Dm and the first node N1 may be electrically connected to each other.

The second transistor M2 may be connected between a first power source ELVDD and the light emitting device EL, and a gate electrode of the second transistor M2 may be connected to the first node N1. The second transistor M2 may control a driving current supplied from the first power source ELVDD to a second power source ELVSS via the light emitting device EL corresponding to a voltage of the first node N1. According to an embodiment, the first power source ELVDD may be a high potential pixel power source, and the second power source ELVSS may be a low potential pixel power source.

The capacitor C may be connected between the first power source ELVDD and the first node N1. The capacitor C may store a voltage corresponding to a data signal supplied to the first node N1 and maintain the stored voltage until a data signal of a subsequent frame is supplied.

The third transistor M3 may be connected between the second transistor M2 and the light emitting device EL, and a gate electrode of the third transistor M3 may be connected to an n-th emission control line En. The third transistor M3 may be turned on or off in response to an emission control signal supplied from the n-th emission control line En.

According to an embodiment, the emission control signal may have a gate-off voltage (e.g., a high voltage) that turns off the third transistor M3. Accordingly, the third transistor M3 may be turned off when the emission control signal is supplied to the n-th emission control line En, and the third transistor M3 may be turned on when a voltage of the emission control signal is set to the gate-on voltage.

The light emitting device EL may be connected between the third transistor M3 and the second power source ELVSS. According to an embodiment, the light emitting device EL may be an organic light emitting diode ("OLED"), but the disclosure is not limited thereto.

When the third transistor M3 is turned on, the light emitting device EL may emit light with brightness corresponding to the driving current controlled by the second transistor M2. When the third transistor M3 is turned on, the second transistor M2 and the light emitting device EL may be electrically connected to each other. Accordingly, a current path from the first power source ELVDD to the second power source ELVSS may be formed via the second transistor M2, the third transistor M3 and the light emitting device EL.

FIG. 10 is a diagram illustrating an embodiment of a driving method of the pixel shown in FIG. 9.

Referring to FIG. 10, a light emitting control signal (or an emission control signal) Fn of a gate-off voltage (for example, a high voltage) may be supplied to the n-th emission control line En before a scan signal Gn of a gate-on voltage (for example, a low voltage) is supplied to the n-th scan line Sn. In an embodiment, as shown in FIG. 10, the light emitting control signal Fn may be supplied for at least a period, during which the scan signal Gn is not supplied, and the light emitting control signal Fn may be supplied after the supply of the scan signal Gn is stopped. In such an embodiment, the voltage of the light emitting control signal Fn may be changed to the gate-on voltage (for example, a low voltage) after the supply of the scan signal Gn is completed, that is, the voltage of the scan signal Gn is changed to the gate-off voltage (for example, a high voltage). When the light emitting control signal Fn of the gate-off voltage is supplied to the emission control line En, the third transistor M3 may be turned off. As a result, the driving current to the light emitting device EL may not be supplied.

In a period during which the light emitting control signal Fn is not supplied to the emission control line En, the scan signal Gn of the gate-on voltage may be supplied to the scan line Sn. When the scan signal Gn is supplied to the scan line Sn, the first transistor M1 may be turned on and the data line Dm and the first node N1 may be electrically connected to each other. Thus, a data signal DS from the data line Dm may be supplied to the first node N1. A voltage corresponding to the data signal DS, for example, a difference voltage between the first power source ELVDD and the data signal DS may be stored in the capacitor C.

After the voltage corresponding to the data signal DS is stored in the capacitor C, the light emitting control signal Fn may be supplied. That is, after the data signal DS is stored in the pixel PXL, the voltage of the light emitting control signal Fn may be changed to the gate-on voltage. Thus, the third transistor M3 may be turned on.

When the third transistor M3 is turned on, the second transistor M2 and the light emitting device EL may be electrically connected to each other. Accordingly, a current path of a driving current from the first power source ELVDD to the second power source ELVSS via the second transistor M2, the third transistor M3 and the light emitting device EL may be formed. The second transistor M2 may control the amount of the driving current corresponding to the voltage of the first node N1, and the light emitting device EL may emit light of a brightness corresponding to the amount of the driving current.

FIG. 11 is a diagram exemplarily illustrating light emitting control signals by controlling of the luminance controller 260' shown in FIG. 8. For convenience of description, light emitting control signals Fn and Fn' supplied to an n-th emission control line En will be described with reference to FIG. 11.

Referring to FIG. 11, in an embodiment, when the fingerprint sensing mode is in the inactivated state, a period, during which the gate-on voltage of the light emitting control signal Fn generated by the luminance controller 260' is maintained, (e.g., an activated period) may a first period T1.

In such an embodiment, when the fingerprint sensing mode is in the activated state, a period, during which the gate-on voltage of the light emitting control signal Fn' generated by the luminance controller 260' is maintained, may a second period T2. In such an embodiment, the second period T2 may be set to be longer than the first period T1. In such an embodiment, the luminance of images may be increased by increasing the period during which the light emitting device EL emits light.

In an embodiment, as described above, the data converter 255 may reduce the scale of the input image data DATA and increase the gray scale of the input image data corresponding to the first display area DA by increasing the period during which the light emitting device EL emits light.

According to an embodiment of the disclosure, a display device includes a fingerprint sensor for sensing a fingerprint of a user by using light emitted from pixels without using an external light source. Accordingly, in such an embodiment, the display device with the fingerprint sensor may have a reduced thickness and the manufacturing cost thereof may be reduced.

In such an embodiment, the sensitivity of the fingerprint sensor may be improved and deterioration of image quality of the display device may be effectively prevented by increasing only the luminance of a fingerprint sensing area.

The invention should not be construed as being limited to the exemplary embodiments set forth herein. Rather, these exemplary embodiments are provided so that this disclosure will be thorough and complete and will fully convey the concept of the invention to those skilled in the art. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated.

While the invention has been particularly shown and described with reference to exemplary embodiments thereof, it will be understood by those of skill in the art that various changes in form and details may be made without departing from the spirit and scope of the invention as set forth in the following claims.

What is claimed:

1. A display device, comprising:
   a display panel including a display area;
   a sensor which senses light reflected by a finger positioned on the display area while an image is displayed in the display area, and
   a data converter which generates scaled-down input image data by applying a predetermined correction coefficient to the input image data when a sensing mode is activated,
   wherein, when the sensing mode is activated, a luminance of a portion of the image displayed in a first display area corresponding to a position of the finger in the display area is increased relative to an image corresponding to the scaled-down input image data of a remaining portion of the image displayed in a second display area corresponding to a remaining portion of the display area other than the first display area.

2. The display device of claim 1, wherein the sensor is a fingerprint sensor which senses a fingerprint of the finger using the light reflected by the finger among light emitted from the display panel when the sensing mode is activated.

3. The display device of claim 1, wherein the data converter converts the scaled-down input image data based on data corresponding to a white pattern.

4. The display device of claim 1, wherein the data converter corrects the scaled-down input image data to increase a gray scale of data corresponding to the first display area of the scaled-down input image data.

5. The display device of claim 1, further comprising a luminance controller which sets a target luminance of the image to a first luminance when the sensing mode is inactivated and sets the target luminance of the image to a second luminance, which is higher than the first luminance, when the sensing mode is activated.

6. The display device of claim 5, wherein:
   when the sensing mode is inactivated, the luminance controller selects a first gamma driving voltage, and
   when the sensing mode is activated, the luminance controller selects a second gamma driving voltage different from the first gamma driving voltage.

7. The display device of claim 5, wherein the display panel further comprises:
   a plurality of pixels in the display area,
   wherein each of the plurality of pixels includes a light emitting device,
   wherein, when the sensing mode is inactivated, the luminance controller controls the light emitting device to emit light during a first period in a frame, and
   wherein, when the sensing mode is activated, the luminance controller controls the light emitting device to emit light during a second period, which is longer than the first period, in the frame.

8. The display device of claim 1, wherein, when the sensing mode is changed from an inactivated state to an activated state, a white image is displayed in the first display area.

9. The display device of claim 1, wherein a luminance of an image displayed in the second display area when the sensing mode is inactivated is substantially the same as a luminance of an image displayed in the second display area when the sensing mode is activated.

10. A method for driving a display device comprising a display panel including a display area and a sensor for sensing light reflected by a finger positioned on the display area, the method comprising:
    activating a sensing mode while displaying an image in the display area;
    generating scaled-down input image data by applying a predetermined correction coefficient to the input image data when the sensing mode is activated;
    increasing a luminance of an image displayed in a first display area corresponding to a position of the finger in the display area relative to an image corresponding to the scaled-down input image data of a remaining portion of the image displayed in a second display area corresponding to a remaining portion of the display area other than the first display area.

11. The method of claim 10, wherein the increasing the luminance of the image displayed in the first display area comprises:
increasing a target luminance of the image.

12. The method of claim 11, wherein the increasing the target luminance of the image comprises changing a gamma driving voltage.

13. The method of claim 11, wherein the display panel comprises:
a plurality of pixels in the display area,
wherein each of the plurality of pixels includes a light emitting device, and
wherein the increasing the target luminance of the image comprises increasing an emission period of the light emitting device.

14. The method of claim 11, wherein the increasing the luminance of the image displayed in the first display area further comprises correcting the scaled-down input image data to increase a gray scale of data corresponding to the first display area of the scaled-down input image data.

15. The method of claim 10, wherein the increasing the luminance of the image displayed in the first display area is performed in a vertical blank period between frames.

* * * * *